United States Patent
Stanton et al.

(10) Patent No.: US 8,214,418 B2
(45) Date of Patent: Jul. 3, 2012

(54) METHOD FOR COMBINING BINARY NUMBERS IN ENVIRONMENTS HAVING LIMITED BIT WIDTHS AND APPARATUS THEREFOR

(75) Inventors: Larry Alan Stanton, Oceanside, CA (US); John Crawford LeVieux, Carlsbad, CA (US)

(73) Assignee: Harris Corporation, Melbourne, FL (US)

( * ) Notice: Subject to any disclaimer, the term of this patent is extended or adjusted under 35 U.S.C. 154(b) by 1260 days.

(21) Appl. No.: 11/984,603

(22) Filed: Nov. 20, 2007

(65) Prior Publication Data
US 2009/0132625 A1 May 21, 2009

(51) Int. Cl.
G06F 17/38 (2006.01)
(52) U.S. Cl. ........................................ 708/524
(58) Field of Classification Search .................. 708/490, 708/523–524, 620–632
See application file for complete search history.

(56) References Cited

U.S. PATENT DOCUMENTS

| | | | |
|---|---|---|---|
| 5,235,537 A | 8/1993 | McWhirter et al. | |
| 5,272,654 A * | 12/1993 | Nix | 708/204 |
| 5,511,017 A | 4/1996 | Cohen et al. | |
| 5,689,259 A | 11/1997 | Ozguc | |
| 6,073,156 A | 6/2000 | Purcell et al. | |
| 6,081,823 A | 6/2000 | Purcell et al. | |
| 6,594,679 B1 | 7/2003 | Lee et al. | |
| 6,973,471 B2 | 12/2005 | Nguyen | |
| 2003/0065699 A1* | 4/2003 | Burns | 708/625 |
| 2010/0306298 A1* | 12/2010 | Cenciotti et al. | 708/402 |

* cited by examiner

*Primary Examiner* — Tan V. Mai
(74) *Attorney, Agent, or Firm* — Duane Morris, LLP (57) ABSTRACT

The present disclosure provides a method and system for combining multiple coefficient words using only the magnitude bits of each of the coefficient words and using the sign bits of each of the coefficient words to modify the output of the combined magnitude bits. Using this method and/or system, it is possible to implement, for example, digital filters using larger coefficient word sizes without having to incur the inefficiencies and cost associated with using additional hardware resources, while maintaining an acceptable gain error in the filter response.

30 Claims, 6 Drawing Sheets

| BOS | B1S | S0 | S1 | S1 RESULT |
|---|---|---|---|---|
| + | + | P0+P1 | (P0+P1) | P0+P1 |
| + | - | P0-P1 | (P0-P1) | P0-P1 |
| - | + | P0-P1 | -(P0-P1) | -P0+P1 |
| - | - | P0+P1 | -(P0+P1) | -P0-P1 |

| Decoder 0 | | S0 to S1 2's NEG | |
|---|---|---|---|
| BOS =B1S | ADD | BOS = + | !NEG |
| BOS!=B1S | SUB | BOS = - | NEG |

| 610 | 620 | 621 | 650 | 681 | 682 | 691 |
|---|---|---|---|---|---|---|
| B0S | B1S | B2S | S0 | S2 | S3 | S3 RESULT |
| + | + | + | P0+P1 | (P0+P1)+P2 | (P0+P1)+P2 | P0+P1+P2 |
| + | + | - | P0+P1 | (P0+P1)-P2 | (P0+P1)-P2 | P0+P1-P2 |
| + | - | + | P0-P1 | (P0-P1)+P2 | (P0-P1)+P2 | P0-P1+P2 |
| + | - | - | P0-P1 | (P0-P1)-P2 | (P0-P1)-P2 | P0-P1-P2 |
| - | + | + | P0-P1 | (P0-P1)+P2 | -((P0-P1)-P2) | -P0+P1+P2 |
| - | + | - | P0-P1 | (P0-P1)-P2 | -((P0-P1)+P2) | -P0+P1-P2 |
| - | - | + | P0+P1 | (P0+P1)-P2 | -((P0+P1)-P2) | -P0-P1+P2 |
| - | - | - | P0+P1 | (P0+P1)+P2 | -((P0+P1)+P2) | -P0-P1-P2 |

| Decoder 0 | | | Decoder 1 | | | S2 to S3 2's NEGATION | |
|---|---|---|---|---|---|---|---|
| BOS =B1S | ADD | | BOS =B2S | ADD | | BOS = + | !NEG |
| BOS!=B1S | SUB | | BOS!=B2S | SUB | | BOS = - | NEG |
| 630 | 640 | | 631 | 641 | | 660 | 670 |

FIGURE 6

METHOD FOR COMBINING BINARY NUMBERS IN ENVIRONMENTS HAVING LIMITED BIT WIDTHS AND APPARATUS THEREFOR

BACKGROUND

The use of digital filters is widespread for a number of reasons, not least of which is that a digital filter can perform filtering functions that may not be practically realizable with analog filters. Digital filters may be employed in signal processing circuitry as well as other circuits where the filtering effect can be expressed as a mathematical function or algorithm. In a typical application, the digital filter modifies an intermediate form of a signal by performing a mathematical operation (e.g., multiplication, addition, etc.) in which a coefficient is combined mathematically with the intermediate signal, or a portion thereof. Usually, there is more than one coefficient being mathematically combined with more than one portion of the signal and hence a set of these coefficients is used to form a digital filter. The term "coefficient word" typically refers to a number having a specific number of binary digits (bits). Digital filters are typically designed with certain design criteria in mind, such as the operating frequency of the filter, a known quality factor ("Q") of the filter, and a known sampling frequency. Using these criteria, a set of coefficient words can be determined to achieve the necessary filtering of a signal.

However, as digital filters are implemented in applications that require increasingly larger coefficient words, more hardware resources, and therefore higher cost, are required to realize the digital filter. For example, the audio frequency range is nominally taken to span the range from 20 Hz to 20 KHz. Typical digital audio sample rates may be 44.1 KHz, 48 KHz or higher. Using a sample rate of 48 KHz as a nonlimiting example, the ratio of the Nyquist limit frequency (24 KHz) to the minimum frequency in the audio frequency range (20 Hz) is 1200 to 1. When designing a digital filter with such a wide frequency ratio, large coefficient word sizes are necessary in order to prevent undesired gain error in the filter response, typically at the lowest of frequencies.

The variety of applications for digital filters continues to grow as the speed, size, complexity, and usefulness of digital filters are improved. Some of these applications include audio filters, video filters, cell phones, radios, transmitters, receivers, motor controllers, audio compact disc players, etc. Digital filters with large coefficient word sizes may require more complex and expensive field programmable gate arrays ("FPGAs"), more costly microprocessors that can operated with large coefficient word sizes, or may require designing circuitry with double the number of components in order to accommodate large coefficient word sizes. In these and other applications, it is highly desirable to minimize the use of hardware resources and so rein in the cost of the digital filter and therefore the overall cost of the device.

Typically, the coefficients used for a digital filter are signed binary numbers in a "two's complement" format, as is known in the art. These coefficients include one bit, sometimes designated the "sign bit", which carries information relating to the sign value of the coefficient and the remaining bits, sometimes designated the "magnitude bits", which carry information relating to the magnitude of the coefficient. In certain applications, multiple coefficients must be combined (e.g., via a multiplier/divider circuit and/or an adder/subtracter circuit) and the known prior art systems perform these combining functions on the entire coefficient word, i.e., on the sign bit and the magnitude bits. Thus, the size of a multiplier input, for example, must be wide enough to accommodate all the magnitude bits and the sign bit of a given coefficient word. As a non-limiting example, if a coefficient word size is 19 bits, i.e., 1 sign bit and 18 magnitude bits, and the width of a multiplier input is only 18 bits wide, then a second multiplier will need to be incorporated into the circuitry in order to accommodate the 19 bit wide coefficient word. This results in inefficiencies and unnecessary expense.

Accordingly, it is an object of the present disclosure to implement a method and apparatus wherein the use of a larger coefficient word size can be realized so as to avoid having to incur the inefficiencies and cost associated with using additional hardware resources while maintaining an acceptable gain error in the filter response.

It is also an object of the present disclosure to provide a method and/or system for combining multiple coefficient words using only the magnitude bits of each of the coefficient words and using the sign bits of each of the coefficient words to modify the output of the combined magnitude bits. Additionally, the magnitude bits of a first coefficient word may be combined (e.g., multiplied) with a first intermediate term word (either signed or unsigned) to form a first resultant word. Similarly, the magnitude bits of a second coefficient word may be combined (e.g., multiplied) with a second intermediate term word (either signed or unsigned) to form a second resultant word. The first and second resultant words may then be combined to form a third resultant word where the sign bits from the first and second coefficient words may be combined to modify the third resultant word.

It is another object of the present disclosure to provide a method for combining binary numbers including receiving a first binary number having a first sign bit and a predetermined number N1 of magnitude bits, receiving a second binary number having a second sign bit and a predetermined number N2 of magnitude bits, combining the N1 magnitude bits with a third binary number having predetermined number M1 bits to thereby form a fourth binary number, combining the N2 magnitude bits with a fifth binary number having predetermined number M2 bits to thereby form a sixth binary number, decoding the first and second sign bits to thereby form a control signal, combining the fourth binary number with the sixth binary number as a function of the control signal to thereby form a seventh binary number, selectively applying a two's complement negation to the seventh binary number as a function of the first sign bit to thereby provide an eighth binary number, and providing the eighth binary number to a digital processing device to thereby modify the output of said digital processing device.

It is yet another object of the present disclosure to provide a method for combining binary numbers including receiving a first binary number having a first sign bit and a predetermined number N1 of magnitude bits, receiving a second binary number having a second sign bit and a predetermined number N2 of magnitude bits, combining the N1 magnitude bits with a third binary number having predetermined number M1 bits to thereby form a fourth binary number, combining the N2 magnitude bits with a fifth binary number having predetermined number M2 bits to thereby form a sixth binary number, decoding the first and second sign bits to thereby form a first control signal, combining the fourth binary number with the sixth binary number as a function of the first control signal to thereby form a seventh binary number, decoding the first sign bit and a third sign bit to thereby form a second control signal, combining the seventh binary number with an eighth binary number as a function of the second control signal to thereby form a ninth binary number, selectively applying a two's complement negation to the ninth binary number as a function of the first sign bit to thereby provide a tenth binary number, and providing the tenth binary number to a digital processing device to thereby modify the output of the digital processing device.

It is still another object of the present disclosure to provide a system for combining binary numbers where the system includes a first coefficient register capable of storing a first binary number having a first sign bit and a predetermined number N1 of magnitude bits, a second coefficient register capable of storing a second binary number having a second sign bit and a predetermined number N2 of magnitude bits, a first combiner operatively connected to the first coefficient register wherein the first combiner combines the N1 magnitude bits with a third binary number having predetermined number M1 bits and provides a fourth binary number as an output, a second combiner operatively connected to the second coefficient register wherein the second combiner combines the N2 magnitude bits with a fifth binary number having predetermined number M2 bits and provides a sixth binary number as an output, a decoder operatively connected to the first and second coefficient registers wherein the decoder decodes the first and second sign bits and provides a control bit as an output, a third combiner operatively connected to the first and second combiners and the decoder wherein the third combiner combines the fourth and sixth binary numbers as a function of the control bit and provides a seventh binary number as an output, and a two's complement negation control element operatively connected to the third combiner and the first coefficient register wherein the two's complement negation control element selectively applies a two's complement negation to the seventh binary number as a function of the first sign bit.

It is a further object of the present disclosure to provide a system for combining binary numbers where the system includes a first coefficient register capable of storing a first binary number having a first sign bit and a predetermined number N1 of magnitude bits, a second coefficient register capable of storing a second binary number having a second sign bit and a predetermined number N2 of magnitude bits, a first combiner operatively connected to the first coefficient register wherein the first combiner combines the N1 magnitude bits with a third binary number having predetermined number M1 bits and provides a fourth binary number as an output, a second combiner operatively connected to the second coefficient register wherein the second combiner combines the N2 magnitude bits with a fifth binary number having predetermined number M2 bits and provides a sixth binary number as an output, a decoder operatively connected to the first and second coefficient registers wherein the decoder decodes the first and second sign bits and provides a control bit as an output, a third combiner operatively connected to the first and second combiners and the decoder wherein the third combiner combines the fourth and sixth binary numbers as a function of the control bit and provides a seventh binary number as an output, a second decoder operatively connected to the first coefficient register and having an input terminal adapted to receive a third sign bit wherein the second decoder decodes the first and third sign bits and provides a second control bit as an output, a fourth combiner operatively connected to the third combiner and the second decoder and having an input terminal adapted to receive an eighth binary number wherein the fourth combiner combines the seventh and eighth binary numbers as a function of the second control bit and provides a ninth binary number as an output, and a second two's complement negation control element operatively connected to the fourth combiner and the first coefficient register wherein the second two's complement negation control element selectively applies a two's complement negation to the ninth binary number as a function of the first sign bit.

These and many other advantages of the present disclosure will be readily apparent to one skilled in the art to which the disclosure pertains from a perusal of the claims, the appended drawings, and the following detailed description.

DETAILED DESCRIPTION

As stated above, designing a digital filter with a wide frequency ratio requires large coefficient word sizes in order to prevent undesired gain error in the filter response, typically at the lowest of frequencies in the design frequency band. The present disclosure includes a method and apparatus, including either hardware alone, software alone, or a combination of hardware and software, in which the size of the coefficient word may be reduced while avoiding the undesired gain error, thereby resulting in a savings of hardware resources, efficiency, and cost. The method and apparatus described herein may sometimes be referred to herein as "Sign Bypass", although the name is not intended to limit the aspects of the disclosure in any way.

A digital filter as discussed herein may be a biquad digital filter. As is known in the art, a biquad (from "biquadratic") digital filter may be used for implementing second order filter types including, but not limited to, a low pass filter, high pass filter, band pass filter, band reject filter, low shelf filter, high shelf filter, etc. The digital filter may be an audio filter, video filter, or other type of filter and may be used in, for example, cell phones, radios, transmitters, receivers, motor controllers, audio compact disc players, etc. A biquad digital filter is not limited to second order filter types. A biquad digital filter may be transformed into any one of a plurality of filter types with any filter Q and any filter corner/center frequency by, for instance, changing a set of (typically five or six, but not limited thereto) pre-calculated coefficients or coefficient words. The word size of the pre-calculated coefficients is typically a critical parameter since it determines both the gain accuracy at the lowest frequency of the operating frequency range and also determines the data path width of the hardware (usually the limiting feature is the input of the hardware multipliers) used in implementing the biquad digital filter.

As discussed above, the coefficients used for a digital filter may be signed binary numbers in a "two's complement" format, having one sign bit and one or more magnitude bits. Typically, when utilizing a coefficient word in a digital filter, coefficients must be combined with intermediate terms by using, for example, a multiplier. Known prior art systems perform the multiplication (or other forms of combining) using the entire coefficient word, i.e., on the sign bit and the magnitude bits. Thus, the size of a multiplier input must be wide enough to accommodate all the magnitude bits and the sign bit of a given coefficient word. If, for example, the input to the multiplier is limited to 18 bits and one or more of the coefficients to be multiplied is 19 bits wide (e.g., 1 sign bit and 18 magnitude bits) then a second multiplier will need to be incorporated into the circuitry and/or software in order to accommodate the 19 bit wide coefficient word.

The present disclosure describes a method and apparatus (including software implementations) wherein the use of a larger coefficient word size can be realized without having to incur the inefficiencies and cost associated with using additional hardware resources. For example, the present disclosure discusses providing a method, an apparatus, and/or software for combining multiple coefficient words using only the magnitude bits of each of the coefficient words and using the sign bits of each of the coefficient words to modify the output of the combined magnitude bits. Additionally, the present disclosure discusses combining the magnitude bits of a first coefficient word with a first intermediate term word (either signed or unsigned) to form a first resultant word; combining the magnitude bits of a second coefficient word with a second intermediate term word (either signed or unsigned) to form a second resultant word; and combining the first and second resultant words to form a third resultant word where the sign bits from the first and second coefficient words may be combined to modify the third resultant word. Thus, the problems associated with the incorporation of additional hardware/software resources may be avoided.

Figure 1:
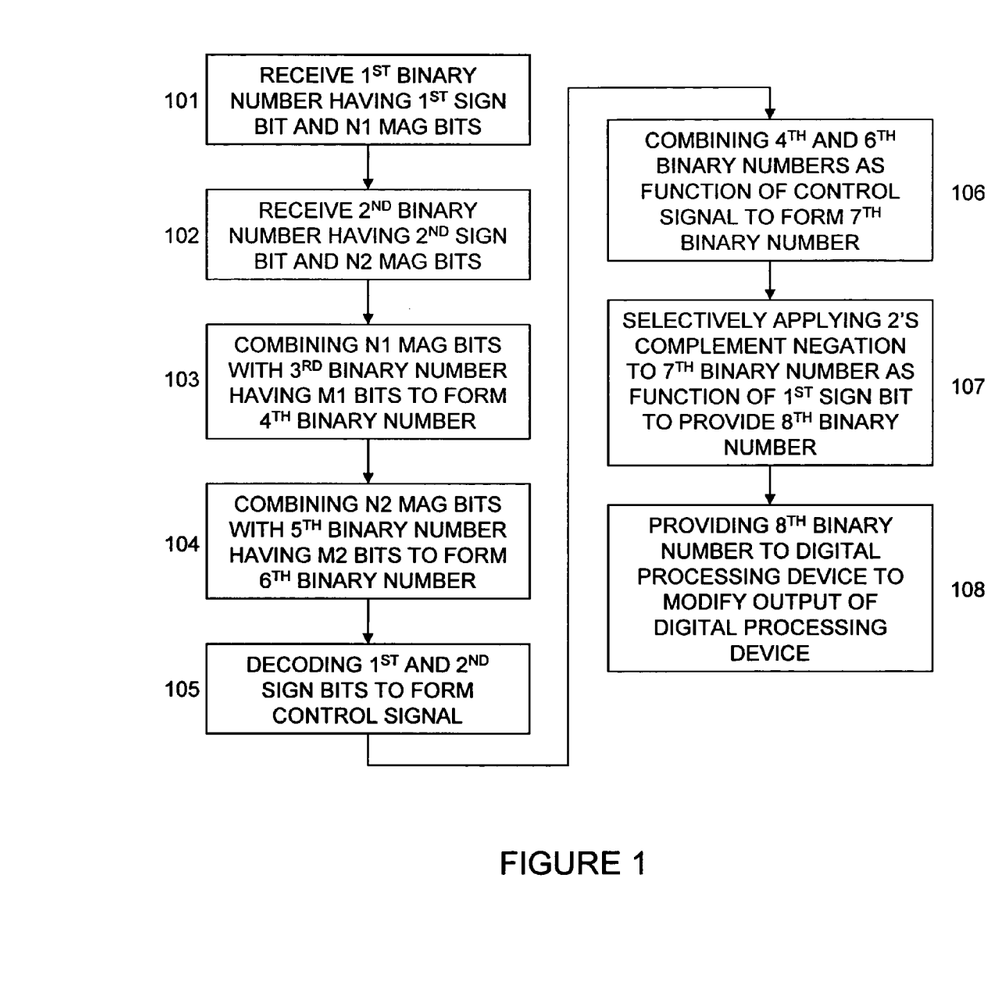
FIG. 1 is a flow diagram for combining binary numbers according to an embodiment of the disclosure.

With reference now to FIG. 1, a flow diagram is presented for combining binary numbers according to an embodiment of the disclosure. At block 101 a first binary number having a first sign bit and a predetermined number N1 of magnitude bits may be received. At block 102 a second binary number having a second sign bit and a predetermined number N2 of magnitude bits may be received. As a non-limiting example, N1 and N2 may each be 18 bits. At block 103 the N1 magnitude bits may be combined with a third binary number having predetermined number M1 bits to thereby form a fourth binary number. This combining may be accomplished via a multiplication. The fourth binary number may include N1+M1 bits. In a particular non-limiting embodiment, the fourth binary number may include 42 bits. Either one or both of the third binary number and the fourth binary number may represent an intermediate term audio signal, although those of skill in the art will readily understand that the teachings of the present disclosure are not limited to this specific example. At block 104 the N2 magnitude bits may be combined with a fifth binary number having predetermined number M2 bits to thereby form a sixth binary number. Either one or both of the fifth binary number and the sixth binary number may represent an intermediate term audio signal, although those of skill in the art will readily understand that the teachings of the present disclosure are not limited to this specific example. The M1 bits and the M2 bits may each constitute 24 bits, although this should not be considered as a limit to the applicability of the present disclosure. At block 105 the first and second sign bits may be decoded, as described in more detail below with reference to FIGS. 3 and 4, to thereby form a control signal. This decoding may be referred to as sign decoding.

With continuing reference to FIG. 1, at block 106 the fourth binary number may be combined with the sixth binary number as a function of the control signal to thereby form a seventh binary number. This combining may be accomplished via an addition or a subtraction. The seventh binary number may include N1+M1+1 bits. In a particular non-limiting embodiment, the seventh binary number may include 43 bits. Additionally, the seventh binary number may be a signed binary number. Furthermore, the seventh binary number may represent an intermediate term audio signal. At block 107, a two's complement negation may be selectively applied to the seventh binary number as a function of the first sign bit to thereby provide an eighth binary number. The selective application of the two's complement negation will be discussed in more detail below. At block 108, the eighth binary number may be provided to a digital processing device to thereby modify the output of the digital processing device. The digital processing device may be a digital filter, an audio filter, a motor controller, or other similar device according to the teachings and spirit of this disclosure.

Figure 2:
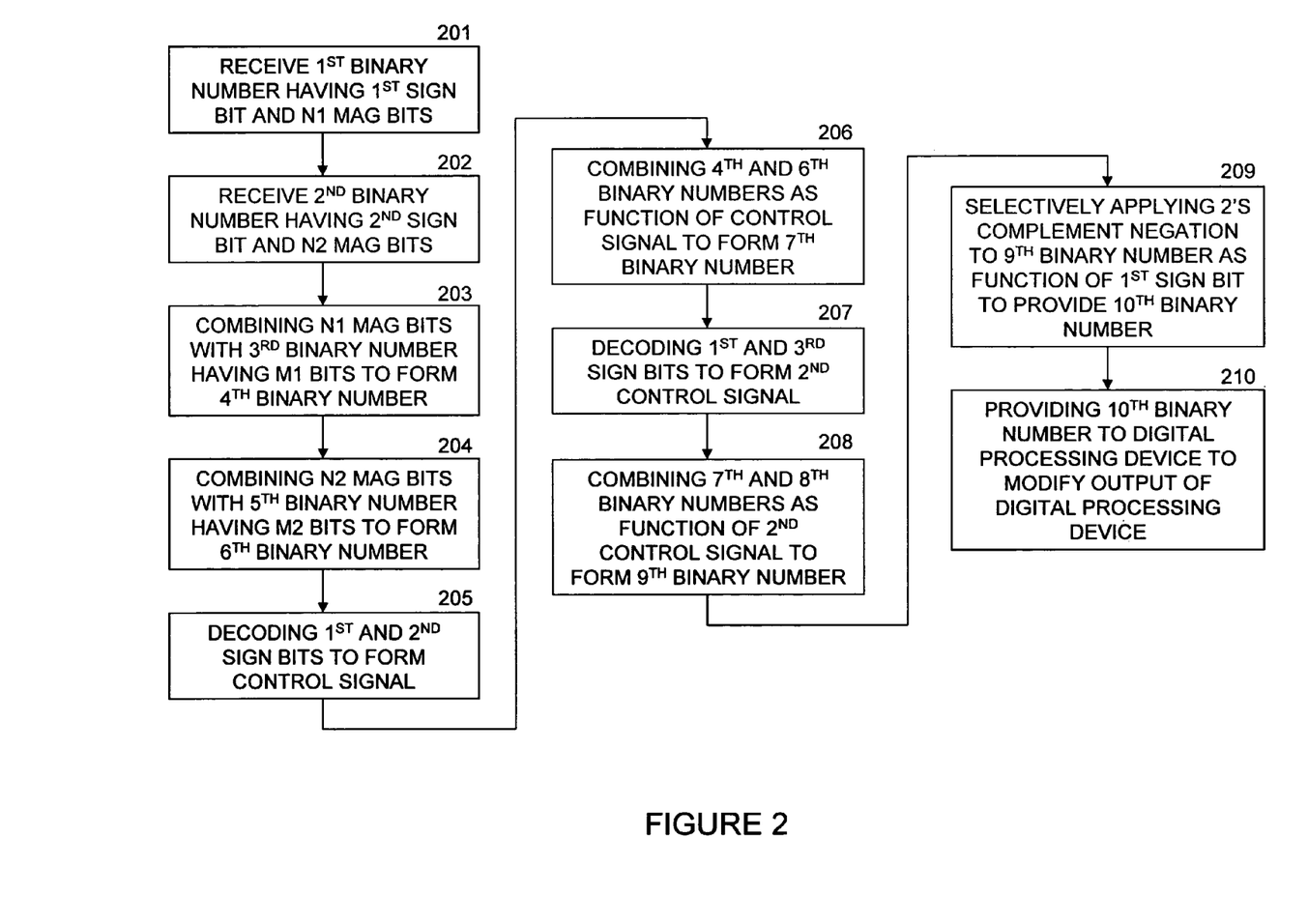
FIG. 2 is a flow diagram for combining binary numbers according to another embodiment of the disclosure.

With attention to FIG. 2, a flow diagram for combining binary numbers according to another embodiment of the disclosure is presented. In FIG. 2, blocks 201 through 206 are similar to blocks 101 through 106 in FIG. 1, respectively, as described above. At block 207, the first sign bit and a third sign bit may be decoded to thereby form a second control signal as described in more detail below with reference to FIGS. 5 and 6. This decoding may be referred to as sign decoding. At block 208, the seventh binary number may be combined with an eighth binary number as a function of the second control signal to thereby form a ninth binary number. The ninth binary number may include N1+M1+2 bits. In a particular non-limiting embodiment, the ninth binary number may include 44 bits. Additionally, the ninth binary number may be a signed binary number. At block 209, a two's complement negation to the ninth binary number may be selectively applied as a function of the first sign bit to thereby provide a tenth binary number. The selective application of the two's complement negation will be discussed in more detail below. At block 210, the tenth binary number may be provided to a digital processing device to thereby modify the output of the digital processing device. The tenth binary number may be an intermediate term for a digital filter. The digital processing device may be a digital filter, an audio filter, a motor controller, or other similar device according to the teachings and spirit of this disclosure.

Figure 3:
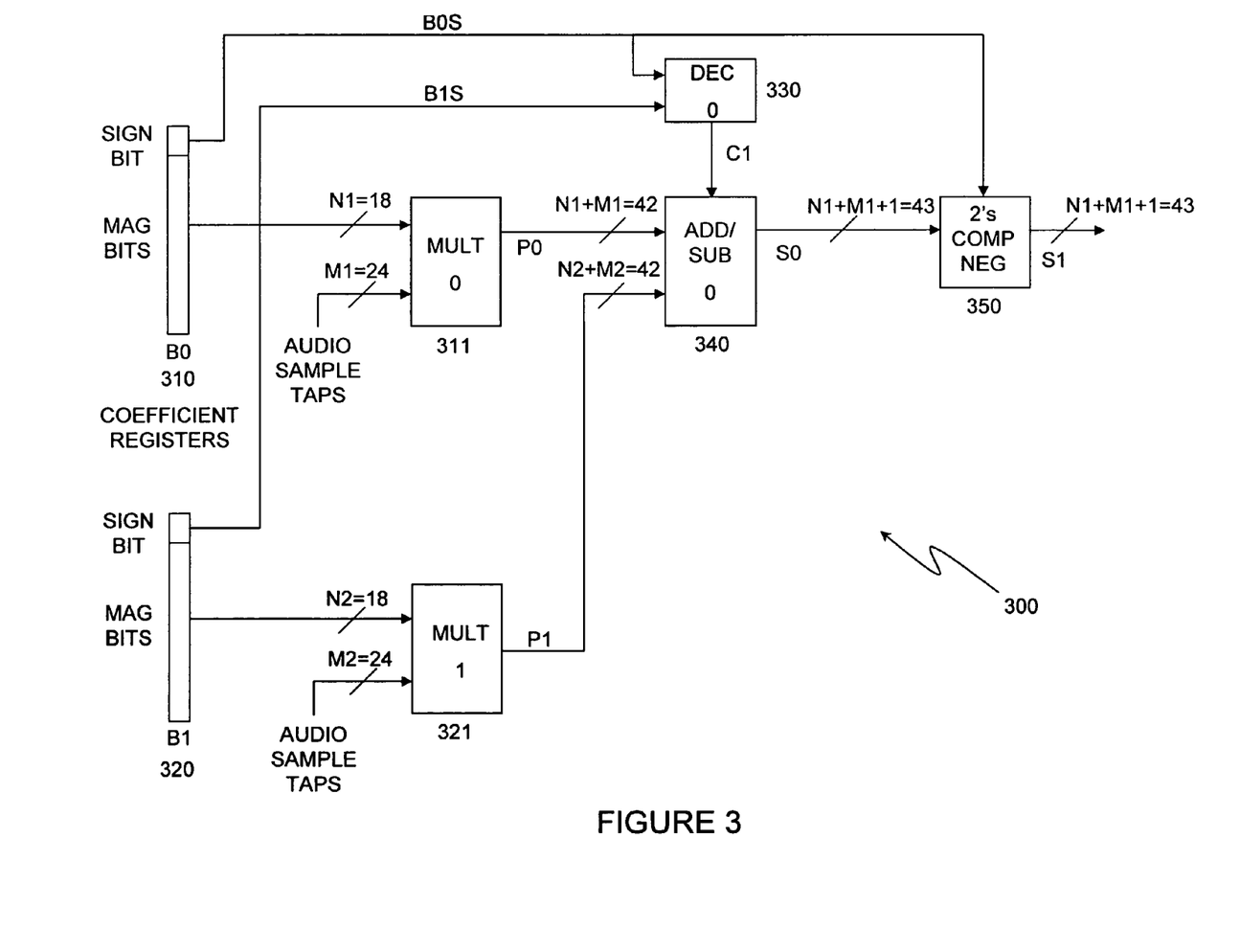
FIG. 3 is a schematic diagram for combining binary numbers according to an embodiment of the disclosure.

Turning now to FIG. 3, a schematic diagram for combining binary numbers according to an embodiment of the disclosure is presented. It will be readily understood by those of skill in the art that while the following discussion is directed towards particular hardware, the present disclosure is not so limited. The disclosed concepts may be implemented using hardware, software, a combination of hardware and software, electrical circuitry, or other devices/processes known in the art that are useful for implementing the disclosed teachings. The system 300 may include a coefficient register 310 (also labeled "B0") capable of storing a first binary number having a first sign bit ("B0S") and a predetermined number N1 of magnitude bits and a coefficient register 320 (also labeled "B1") capable of storing a second binary number having a second sign bit ("B1S") and a predetermined number N2 of magnitude bits. In an embodiment, N1=N2=18 bits, although those of skill in the art will readily understand that the present disclosure is not limited to this embodiment. A combiner 311 (also labeled "MULT 0") may be operatively connected to the coefficient register 310 so that the N1 magnitude bits of the first binary number are input into the combiner 311. As discussed previously, the combiner 311 may be a multiplier or other known type of combining device, circuitry, or software. The combiner 311 may also have a second input which, in one embodiment, receives M1 bits from a third binary number where the third binary number may contain information from audio sample taps. The third binary number may represent an intermediate term of an audio signal. In an embodiment, M1=24 bits. The combiner 311 may combine the N1 magnitude bits with the M1 bits of the third binary number and output a fourth binary number, labeled P0, having N1+M1 bits. The system 300 may also include a combiner 321 (also labeled "MULT 1") which may be operatively connected to the coefficient register 320 so that the N2 magnitude bits of the second binary number are input into the combiner 321, which may be a multiplier as discussed above. The combiner 321 may also have a second input which, in one embodiment, receives M2 bits from a fifth binary number where the fifth binary number may contain information from audio sample taps (which may be the same or different as the audio sample taps discussed above with respect to the third binary number). The fifth binary number may represent an intermediate term of an audio signal. In an embodiment, M2=24 bits. The combiner 321 may combine the N2 magnitude bits with the M2 bits of the fifth binary number and output a sixth binary number, labeled P1, having N2+M2 bits.

The decoder 330 (also labeled "DEC 0") may be operatively connected to the coefficient registers 310 and 320 such that the sign bits B0S and B1S are input into the decoder 330. The decoder 330 decodes the B0S and B1S sign bits and outputs a control signal C1. The control signal C1 may include one or more bits. The decoder 330 and the decoding process will be discussed in further detail below. The combiner 340 (also labeled "ADD/SUB 0") may be operatively connected to the combiners 311 and 321 and to the decoder 330. The combiner 340 may be an adder/subtracter and may receive as inputs the fourth and sixth binary numbers, P0 and P1 from the combiners 311 and 312, respectively, as well as the control signal C1 from the decoder 330. The combiner 340 selectively operates on P0 and P1 as a function of the control signal C1 and outputs a seventh binary number S0. The details of the combination of P0 and P1 as a function of C1 will be discussed in further detail below. The seventh binary number may be a signed binary number and may include N1+M1+1 bits. Additionally, the seventh binary number may be an intermediate term audio signal.

The two's complement negation control element 350 (also labeled "2's COMP") may be operatively connected to combiner 340 and to coefficient register 310. The two's complement negation control element 350 may receive as inputs the seventh binary number S0 from the combiner 340 and the first sign bit B0S from the coefficient register 310. The two's complement negation control element 350 selectively applies a two's complement negation to the seventh binary number as a function of the first sign bit B0S and outputs an eighth binary number S1 which may be an intermediate term for a digital filter. The details of the two's complement negation control element 350 will be discussed in further detail below.

Figure 4:
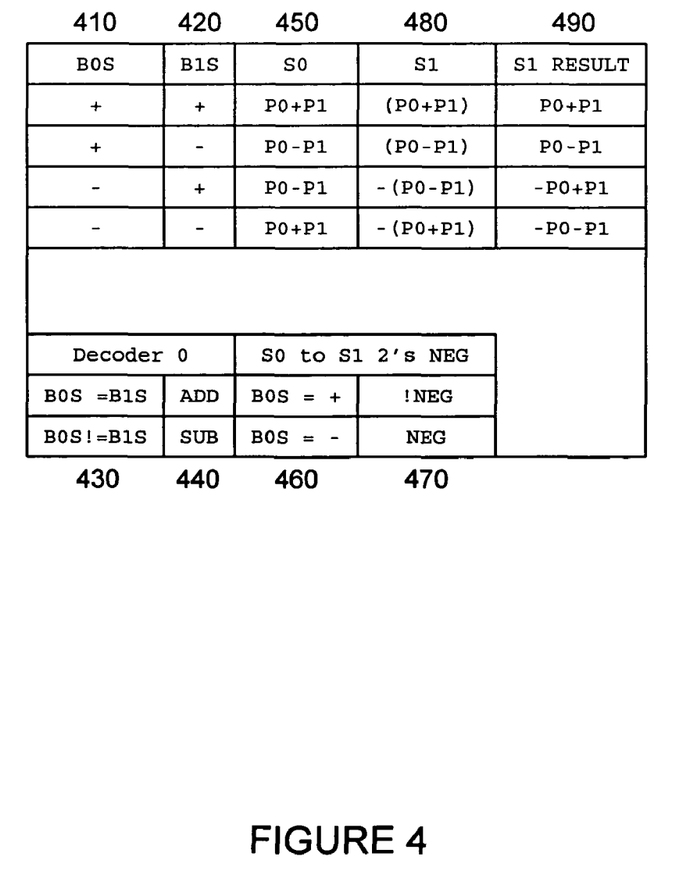
FIG. 4 is a truth table applicable to FIGS. 1 and 3.

FIG. 4 represents a truth table applicable to FIGS. 1 and 3. Column 410 represents the possible binary values of the first sign bit B0S and column 420 represents the possible binary values of the second sign bit B1S such that all permutations of B0S and B1S are presented. As is known in the art, the standard convention is that a "+" in FIG. 4 (and/or FIG. 6) is typically associated with a logical "0" signal and a "−" is typically associated with a logical "1" signal, although the present disclosure is equally applicable to the reverse convention. Thus, a "+" in column 410 typically represents a logical "0" for the first sign bit B0S while a "−" in column 410 typically represents a logical "1" for the first sign bit B0S. Columns 430 and 440 indicate how the decoder 330 decodes B0S and B1S and the value of, or information contained in, the control signal C1. As seen in column 430, if B0S=B1S then, in column 440, C1 is an ADD signal. If B0S≠B1S (where the symbol "!=" is known in the art to signify "not equal to") then C1 is a SUB (subtract) signal. As discussed above with reference to FIG. 3, the combiner 340 selectively operates on P0 and P1 as a function of the control signal C1 to output the seventh binary number S0. Looking now at column 450 of FIG. 4, S0 is formed from combining P0 and P1 such that P0 and P1 are added together when B0S=B1S and P1 is subtracted from P0 when B0S≠B1S.

As discussed above with reference to FIG. 3, the two's complement negation control element 350 selectively applies a two's complement negation to the seventh binary number S0 as a function of the first sign bit B0S and outputs an eighth binary number S1. Column 460 in FIG. 4 represents the possible binary values for B0S, i.e., either positive or negative. Column 470 indicates how the two's complement negation control element 350 operates on S0: if B0S is positive, then S0 is not complemented (i.e., not negated, where the symbol "!NEG" is known in the art to signify "not negated") and if B1S is negative, then S0 is complemented (i.e., negated). With attention now directed to columns 450 and 480, it can be readily seen that S1 is formed from S0 as a function of the value of B0S, i.e., when B0S is positive, S1 is the same as S0 and when B0S is negative, S0 is complemented in order to form S1. Column 490 represents the same values for S1 as column 480, albeit in an algebraically simpler format. S1 may be used, for example, as an intermediate term in a digital filter, as a signal to modify the output of a digital processing device, or other similar function. Thus, FIG. 4 represents the operation of the decoder 330, the combiner 340, and the two's complement negation control element 350.

Figure 5:
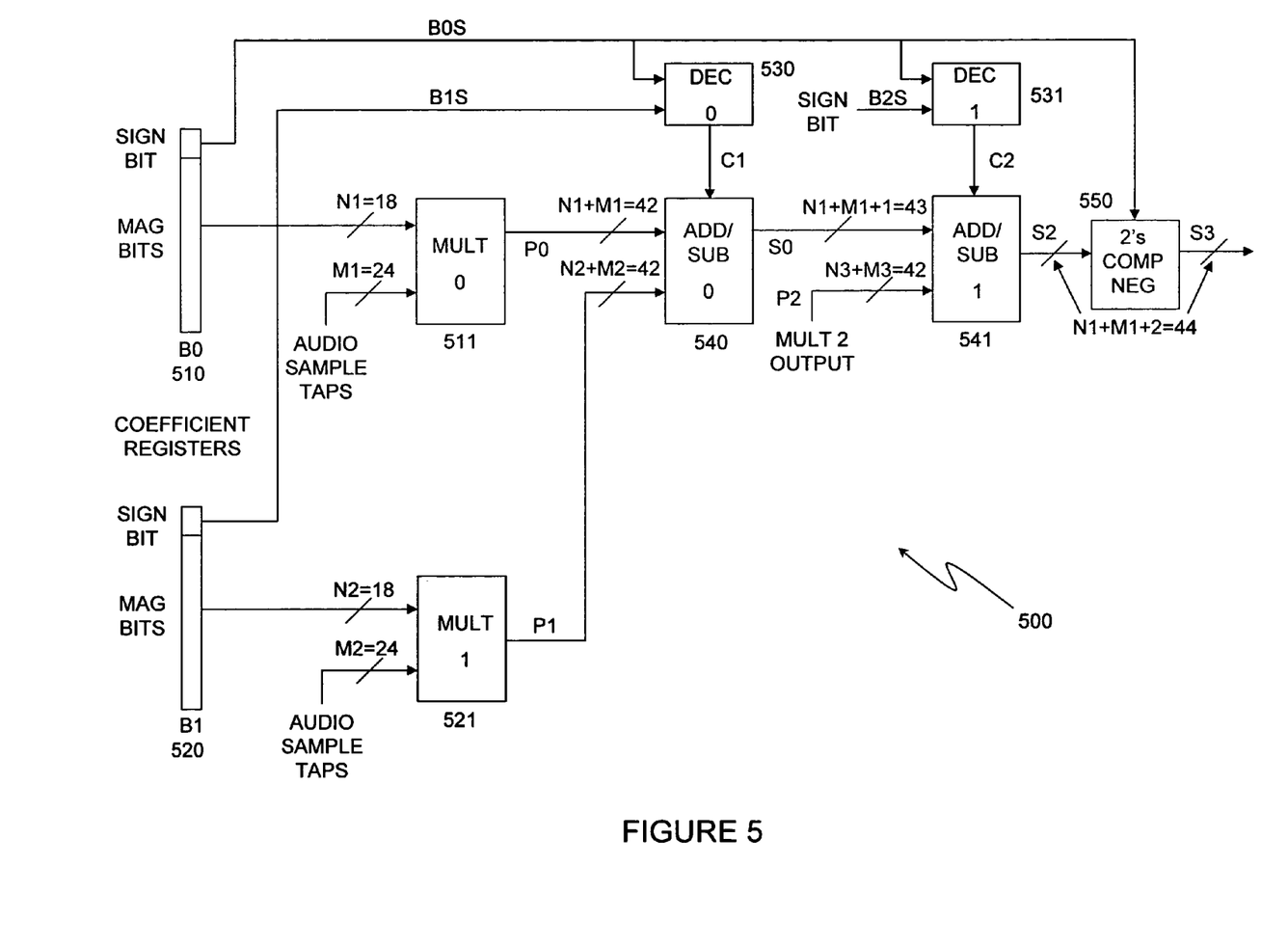
FIG. 5 is a schematic diagram for combining binary numbers according to another embodiment of the disclosure.

With reference now directed to FIG. 5, a schematic diagram for combining binary numbers according to another embodiment of the disclosure is presented. It will be readily understood by those of skill in the art that while the following discussion is directed towards particular hardware, the present disclosure is not so limited. The disclosed concepts may be implemented using hardware, software, a combination of hardware and software, electrical circuitry, or other devices/processes known in the art that are useful for implementing the disclosed teachings. The system 500 has some similarities to the system 300 of FIG. 3 where like components are identified with like numerals or identical labels. Regarding the similarities between the system 500 of FIG. 5 and the system 300 of FIG. 3, coefficient register 510 is similar to coefficient register 310 (each also labeled "B0"); coefficient register 520 is similar to coefficient register 320 (each also labeled "B1"); combiner 511 is similar to combiner 311 (each also labeled "MULT 0"); combiner 521 is similar to combiner 321 (each also labeled "MULT 1"); decoder 530 is similar to decoder 330 (each also labeled "DEC 0"); combiner 540 is similar to combiner 340 (each also labeled "ADD/SUB 0"); and the sign bits B0S and B1S, the binary numbers P0, P1, S0, and the control signal C1 are similar between FIGS. 3 and 5. Accordingly, these components and their operation will not be repeated.

With continuing reference to FIG. 5, decoder 531 (also labeled "DEC 1") may be operatively connected to the coefficient register 510 and a third coefficient register (not shown for clarity) such that sign bit B0S and a third sign bit B2S from the third coefficient register are input into the decoder 531. The decoder 531 decodes the B0S and B2S sign bits and outputs a control signal C2. The control signal C2 may include one or more bits. The decoders 530 and 531 and the decoding process will be discussed in further detail below. The combiner 541 (also labeled as "ADD/SUB 1") may be operatively connected to the combiner 540 and to another combiner (not shown for clarity). The combiner 541 may be an adder/subtracter, as described above, and may receive as inputs the seventh binary number S0 and an eighth binary number P2 as shown in FIG. 5 as well as the control signal C2 from the decoder 531. The eighth binary number P2 may contain information from audio sample taps (not shown for clarity) and P2 may represent an intermediate term audio signal. The combiner 541 selectively operates on S0 and P2 as a function of C2 and outputs a ninth binary number S2. The details of the combination of S0 and P2 as a function of C2 will be discussed in further detail below. The ninth binary number may be a signed binary number and may include N1+M1+2 bits. Additionally, the ninth binary number may be an intermediate term audio signal.

The two's complement negation control element 550 (also labeled "2's COMP") may be operatively connected to combiner 541 and coefficient register 510. The two's complement negation control element 550 may receive as inputs the ninth binary number S2 from the combiner 541 and the first sign bit B0S from the coefficient register 510. The two's complement negation control element 550 selectively applies a two's complement negation to the ninth binary number as a function of the first sign bit B0S and outputs a tenth binary number S3 which may be an intermediate term for a digital filter. The details of the two's complement negation control element 550 will be discussed in further detail below.

Figure 6:
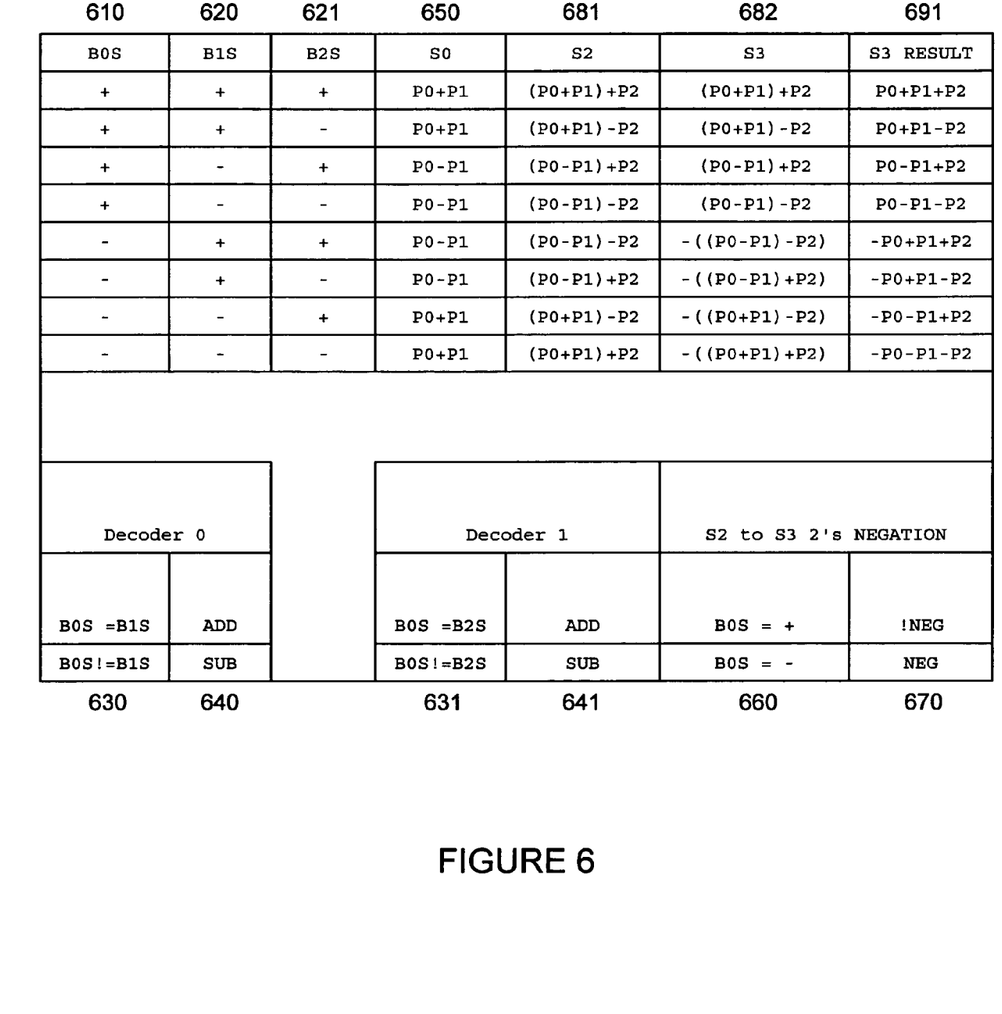
FIG. 6 is a truth table applicable to FIGS. 2 and 5.

FIG. 6 represents a truth table applicable to FIGS. 2 and 5. Column 610 represents the possible binary values of the first sign bit B0S, column 620 represents the possible binary values of the second sign bit B1S, and column 621 represents the possible binary values of the third sign bit B2S such that all permutations of B0S, B1S, and B2s are presented. Columns 630 and 640 indicate how the decoder 530 decodes B0S and B1S and the value of, or information contained in, the control signal C1. Similarly, columns 631 and 641 indicate how the decoder 531 decodes B0S and B2S and the value of, or the information contained in, the control signal C2. As seen in column 630, if B0S=B1S then, in column 640, C1 is an ADD signal. If B0S≠B1S (where the symbol "!=" is known in the art to signify "not equal to") then C1 is a SUB (subtract) signal. Likewise, in column 631, if B0S=B2S then, in column 641, C2 is an ADD signal. If B0S≠B2S then C2 is a SUB (subtract) signal.

As discussed above with reference to FIG. 5, the combiner 540 selectively operates on P0 and P1 as a function of the control signal C1 to output the seventh binary number S0. Looking now at column 650 of FIG. 6, S0 is formed from combining P0 and P1 such that P0 and P1 are added together when B0S=B1S and P1 is subtracted from P0 when B0S≠B1S. Correspondingly, the combiner 541 selectively operates on S0 and P2 as a function of the control signal C2 to output the ninth binary number S2. Looking now at column 681 of FIG. 6, S2 is formed from combining S0 and P2 such that S0 and P2 are added together when B0S=B2S and P2 is subtracted from S0 when B0S≠B2S.

As discussed above with reference to FIG. 5, the two's complement negation control element 550 selectively applies a two's complement negation to the ninth binary number S2 as a function of the first sign bit B0S and outputs a tenth binary number S3. Column 660 in FIG. 6 represents the possible binary values for B0S, i.e., either positive or negative. Column 670 indicates how the two's complement negation control element 550 operates on S2: if B0S is positive, then S2 is not complemented (where, as discussed above, the symbol "!NEG" is known in the art to signify "not negated") and if B1S is negative, then S2 is complemented. With attention now directed to columns 681 (where column 681 is described in the immediately preceding paragraph) and 682, it can be readily seen that S3 is formed from S2 as a function of the value of B0S, i.e., when B0S is positive, S3 is the same as S2 and when B0S is negative, S2 is complemented in order to form S3. Column 691 represents the same values for S3 as column 682, albeit in an algebraically simpler format. S3 may be used, for example, as a coefficient word in a digital filter, as a signal to modify the output of a digital processing device, or other similar function. Thus, FIG. 6 represents the operation of the decoders 530 and 531, the combines 540 and 541, and the two's complement inversion control element 550.

While preferred embodiments of the present disclosure have been described, it is to be understood that the embodiments described are illustrative only and that the scope of the invention is to be defined solely by the appended claims when accorded a full range of equivalents, many variations and modifications naturally occurring to those of skill in the art from a perusal hereof.

We claim:

1. A method of combining binary numbers, comprising:
   (a) receiving a first binary number having a first sign bit and a predetermined number N1 of magnitude bits;
   (b) receiving a second binary number having a second sign bit and a predetermined number N2 of magnitude bits;
   (c) combining said N1 magnitude bits with a third binary number having predetermined number M1 bits to thereby form a fourth binary number in a first combining device;
   (d) combining said N2 magnitude bits with a fifth binary number having predetermined number M2 bits to thereby form a sixth binary number in a second combining device;
   (e) decoding said first and second sign bits to thereby form a control signal;
   (f) combining said fourth binary number with said sixth binary number as a function of said control signal to thereby form a seventh binary number in a third combining device;
   (g) selectively applying a two's complement negation to said seventh binary number as a function of said first sign bit to thereby provide an eighth binary number; and
   (h) providing said eighth binary number to a digital processing device to thereby modify the output of said digital processing device.

2. The method of claim 1 wherein said digital processing device is selected from the group consisting of: digital filter, audio filter, and motor controller.

3. The method of claim 1 wherein at least one of said third binary number and said fifth binary number represents an intermediate term audio signal.

4. The method of claim 1 wherein N1=N2=18.

5. The method of claim 1 wherein M1=M2=24.

6. The method of claim 1 wherein said combining of said N1 magnitude bits with said third binary number comprises multiplication.

7. The method of claim 6 wherein said fourth binary number comprises N1+M1 bits.

8. The method of claim 6 wherein at least one of said fourth binary number and said sixth binary number represents an intermediate term audio signal.

9. The method of claim 1 wherein said combining of said fourth binary number with said sixth binary number comprises addition or subtraction.

10. The method of claim 9 wherein said seventh binary number comprises N1+M1+1 bits.

11. The method of claim 10 wherein at least one of said fourth or sixth binary number is a signed binary number.

12. The method of claim 9 wherein said seventh binary number represents an intermediate term audio signal.

13. The method of claim 1 wherein said decoding of said first sign bit with said second sign bit comprises sign decoding.

14. The method of claim 1 wherein steps (g) and (h) are replaced with:
(i) decoding said first sign bit and a third sign bit to thereby form a second control signal;
(j) combining said seventh binary number with an eighth binary number as a function of said second control signal to thereby form a ninth binary number;
(k) selectively applying a two's complement negation to said ninth binary number as a function of said first sign bit to thereby provide a tenth binary number; and
(l) providing said tenth binary number to a digital processing device to thereby modify the output of said digital processing device.

15. The method of claim 14 wherein said ninth binary number is a signed binary number.

16. The method of claim 15 wherein said ninth binary number comprises forty-four bits.

17. The method of claim 14 wherein said tenth binary number is an intermediate term for a digital filter.

18. A system for combining binary numbers, comprising:
a first coefficient register capable of storing a first binary number having a first sign bit and a predetermined number N1 of magnitude bits;
a second coefficient register capable of storing a second binary number having a second sign bit and a predetermined number N2 of magnitude bits;
a first combiner operatively connected to said first coefficient register wherein said first combiner combines said N1 magnitude bits with a third binary number having predetermined number M1 bits and provides a fourth binary number as an output;
a second combiner operatively connected to said second coefficient register wherein said second combiner combines said N2 magnitude bits with a fifth binary number having predetermined number M2 bits and provides a sixth binary number as an output;
a decoder operatively connected to said first and second coefficient registers wherein said decoder decodes said first and second sign bits and provides a control signal as an output;
a third combiner operatively connected to said first and second combiners and said decoder wherein said third combiner combines said fourth and sixth binary numbers as a function of said control signal and provides a seventh binary number as an output; and
a two's complement negation control element operatively connected to said third combiner and said first coefficient register wherein said two's complement negation control element selectively applies a two's complement negation to said seventh binary number as a function of said first sign bit.

19. The system of claim 18 wherein at least one of said third binary number and said fifth binary number represents an intermediate term of an audio signal.

20. The system of claim 18 wherein N1=N2=18.

21. The system of claim 20 wherein M1=M2=24.

22. The system of claim 18 wherein at least one of said first combiner and said second combiner is a multiplier.

23. The system of claim 18 wherein said third combiner is an adder/subtracter.

24. The system of claim 18 wherein said seventh binary number is a signed binary number.

25. The system of claim 24 wherein said seventh binary number comprises N1+M1+1 bits.

26. The system of claim 18 wherein said seventh binary number is an intermediate term audio signal.

27. The system of claim 18 wherein said two's complement negation control element is replaced with:
a second decoder operatively connected to said first coefficient register and having an input terminal adapted to receive a third sign bit wherein said second decoder decodes said first and third sign bits and provides a second control signal as an output;
a fourth combiner operatively connected to said third combiner and said second decoder and having an input terminal adapted to receive an eighth binary number wherein said fourth combiner combines said seventh and eighth binary numbers as a function of said second control signal and provides a ninth binary number as an output; and
a second two's complement negation control element operatively connected to said fourth combiner and said first coefficient register wherein said second two's complement negation control element selectively applies a two's complement negation to said ninth binary number as a function of said first sign bit.

28. The system of claim 27 wherein said ninth binary number is a signed binary number.

29. The system of claim 28 wherein said ninth binary number comprises forty-four bits.

30. The system of claim 27 wherein said tenth binary number is an intermediate term for a digital filter.

* * * * *